United States Patent
Chang et al.

(10) Patent No.: US 8,190,905 B1
(45) Date of Patent: May 29, 2012

(54) AUTHORIZING ADMINISTRATIVE OPERATIONS USING A SPLIT KNOWLEDGE PROTOCOL

(75) Inventors: Lawrence Wen-Hao Chang, San Francisco, CA (US); Ananthan Subramanian, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 803 days.

(21) Appl. No.: 11/541,024

(22) Filed: Sep. 29, 2006

(51) Int. Cl.
*H04L 29/06* (2006.01)

(52) U.S. Cl. .......... 713/180; 709/229; 380/30; 380/286; 705/7

(58) Field of Classification Search .................. 709/229; 380/286, 9, 862, 30; 705/7
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,588,991 A | 5/1986 | Atalla | |
| 4,757,533 A | 7/1988 | Allen et al. | |
| 5,065,429 A | 11/1991 | Lang | |
| 5,150,407 A | 9/1992 | Chan | |
| 5,185,717 A | 2/1993 | Mori | |
| 5,208,853 A * | 5/1993 | Armbruster et al. | 705/56 |
| 5,235,641 A | 8/1993 | Nozawa | |
| 5,235,642 A | 8/1993 | Wobber et al. | |
| 5,265,159 A | 11/1993 | Kung | |
| 5,485,519 A * | 1/1996 | Weiss | 713/185 |
| 5,677,952 A | 10/1997 | Blakeley, III et al. | |
| 5,687,237 A | 11/1997 | Naclerio | |
| 5,720,034 A | 2/1998 | Case | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane | |
| 6,026,163 A * | 2/2000 | Micali | 705/80 |
| 6,049,612 A * | 4/2000 | Fielder et al. | 380/44 |
| 6,073,237 A | 6/2000 | Ellison | |
| 6,134,660 A | 10/2000 | Boneh et al. | |

(Continued)

FOREIGN PATENT DOCUMENTS

WO    WO 02/093314 A2    11/2002

(Continued)

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

(Continued)

*Primary Examiner* — Vivek Srivastava
*Assistant Examiner* — Michael D Anderson
(74) *Attorney, Agent, or Firm* — Cesari and McKenna, LLP

(57) ABSTRACT

A system and method for authorizing administrative operations in a computer is provided. The computer initiates the split knowledge protocol upon an attempt by an administrator to invoke the operations. The administrator identifies a predetermined number of entities designated to authorize the operation. The computer creates a bit sequence and splits the bit sequence into a number of segments equal to the predetermined number of entities. Each entity thereafter decrypts a respective element to essentially authorize invocation of the operations. In response, the computer processes the decrypted segments to re-create the bit sequence. As an added level of security, the computer coma) pares the re-created bit sequence with the originally created sequence and, if they match, performs the operations.

25 Claims, 5 Drawing Sheets

U.S. PATENT DOCUMENTS

| | | | |
|---|---|---|---|
| 6,175,924 | B1 | 1/2001 | Arnold |
| 6,185,681 | B1 | 2/2001 | Zizzi |
| 6,185,684 | B1 | 2/2001 | Pravetz et al. |
| 6,212,600 | B1 | 4/2001 | Friedman et al. |
| 6,246,771 | B1 * | 6/2001 | Stanton et al. ............... 380/286 |
| 6,249,866 | B1 | 6/2001 | Brundrett |
| 6,345,101 | B1 | 2/2002 | Shukla |
| 6,356,941 | B1 | 3/2002 | Cohen |
| 6,405,315 | B1 | 6/2002 | Burns et al. |
| 6,408,336 | B1 * | 6/2002 | Schneider et al. ............ 709/229 |
| 6,414,884 | B1 | 7/2002 | DeFelice et al. |
| 6,507,911 | B1 | 1/2003 | Langford |
| 6,550,011 | B1 | 4/2003 | Sims, III |
| 6,584,568 | B1 * | 6/2003 | Dircks et al. ..................... 726/2 |
| 6,625,734 | B1 | 9/2003 | Marvit et al. |
| 6,684,222 | B1 | 1/2004 | Cornelius et al. |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,868,406 | B1 | 3/2005 | Ogg et al. |
| 6,915,435 | B1 | 7/2005 | Merriam |
| 6,993,661 | B1 | 1/2006 | Garfinkel |
| 7,003,674 | B1 | 2/2006 | Hamlin |
| 7,020,779 | B1 | 3/2006 | Sutherland |
| 7,079,653 | B2 * | 7/2006 | Scheidt et al. ................ 380/258 |
| 7,093,127 | B2 | 8/2006 | McNulty et al. |
| 7,096,355 | B1 | 8/2006 | Marvit et al. |
| 7,120,696 | B1 | 10/2006 | Au et al. |
| 7,136,995 | B1 | 11/2006 | Wann |
| 7,146,505 | B1 | 12/2006 | Harada et al. |
| 7,215,771 | B1 | 5/2007 | Hamlin |
| 7,222,228 | B1 | 5/2007 | Stephens et al. |
| 7,240,197 | B1 | 7/2007 | Yamagami et al. |
| 7,260,724 | B1 | 8/2007 | Dickinson et al. |
| 7,340,500 | B2 | 3/2008 | Traversat et al. |
| 2001/0054155 | A1 | 12/2001 | Hagan et al. |
| 2002/0046286 | A1 | 4/2002 | Caldwell et al. |
| 2002/0073324 | A1 | 6/2002 | Hsu |
| 2002/0082885 | A1 * | 6/2002 | Pittroff .............................. 705/7 |
| 2002/0114453 | A1 | 8/2002 | Bartholet et al. |
| 2003/0028765 | A1 | 2/2003 | Cromer et al. |
| 2007/0024471 | A1 * | 2/2007 | Booth ............................. 341/50 |
| 2007/0058801 | A1 | 3/2007 | Plotkin |
| 2007/0174634 | A1 | 7/2007 | Plotkin |

FOREIGN PATENT DOCUMENTS

| | | | |
|---|---|---|---|
| WO | WO 02/093314 A3 | 11/2002 | |

OTHER PUBLICATIONS

Antonelli, et al., "The Packet Vault: Secure Storage of Network Data," CITI Technical Report 98-5, pp. 1-15, Jun. 25. 1998.

Blaze, "Oblivious Key Escrow," Information Hiding, First International Workshop, Cambridge, UK, May 30-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System." USENIX Summer 1994 Technical Conference, pp. 27-35, (Jun. 6-10, 1994).

Boneh, et al., "A Revocable Backup System," in Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS Pub 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS Pub 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Selt-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments." Proceedings of the Second USENIX Workshop on Electronic Commerce, pp. 23-28 (Nov. 18-21. 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory." Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81,1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes at al., "Handbook of Applied Cryptography," CRC Press, Section 13.7.1, 4 pages, 1997.

Moore, "Preventing Access to a Personal Computer." IBM Technical Disdosure Bulletin, pp. 98-100, Sep. 1992.

Omniva Policy Systems, www.omniva.com (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee at al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

\* cited by examiner

AUTHORIZING ADMINISTRATIVE OPERATIONS USING A SPLIT KNOWLEDGE PROTOCOL

FIELD OF THE INVENTION

The present invention relates to security appliances, and more specifically, to authorizing administrative operations on a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, is such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is embodied as a computer configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

It is often advisable that certain sensitive administrative operations of a security appliance be limited to prevent the occurrence of security breaches by, e.g., the compromising of an administrator of the appliance. A single administrator having the authority to perform all administrative operations on a security appliance becomes a single point of failure. The administrator may be corrupted by, e.g., bribery, blackmail, etc., to relinquish secure information and/or to limit the security features of the appliance. For sensitive operations, it is thus desirous to require the authorization of more than a single administrator to perform certain administrative operations to thereby increase the secure nature of a computer, such as a security appliance.

SUMMARY OF THE INVENTION

The disadvantages of the prior art are overcome by providing a split knowledge protocol adapted to authorize administrative operations on a computer. Broadly stated, the computer initiates the split knowledge protocol upon an attempt by an administrator to invoke the operations. At that time, the computer prompts the administrator for information, such as identification of a predetermined number of entities designated to authorize the operation. As a result, the computer creates a bit sequence and splits the bit sequence into a number of segments equal to the predetermined number of entities. Each of the segments is then encrypted with an encryption key associated with one of the approving entities. Each entity thereafter decrypts a respective element to essentially authorize invocation of the operations. In response, the computer processes the decrypted segments to re-create the bit sequence. As an added level of security, the computer compares the re-created bit sequence with the originally created sequence and, if they match, performs the operations.

In the illustrative embodiment, the entities comprise a plurality of recovery officers associated with the computer, such as a security appliance. Each recovery officer is further associated with a recovery smart card containing a recovery key. To perform certain sensitive administrative operations, an appropriate quorum of the recovery officers associated with the security appliance is designated to authorize the operation. The administrator initiates the operation by identifying the recovery officers designated to authorize the administrative operations. The security appliance then initiates the split knowledge protocol by generating a random bit sequence and splitting the sequence into a number of segments equal to the number of recovery officers authorizing the operation. Illustratively, the sequence is split in a manner that enables generation of the original sequence by exclusive ORing each of the split segments together. The security appliance then encrypts each segment with a recovery key associated with the recovery card of one of the recovery officers authorizing the operation.

The approving recovery officers then decrypt their respective encrypted segments utilizing the associated recovery keys stored within their recovery cards. The decrypted to segments are supplied to the security appliance, which processes those segments to re-create the random sequence. Should the re-created random sequence match the initially generated random sequence, the security appliance performs the requested operation as the necessary quorum of recovery officers has authorized the operation.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
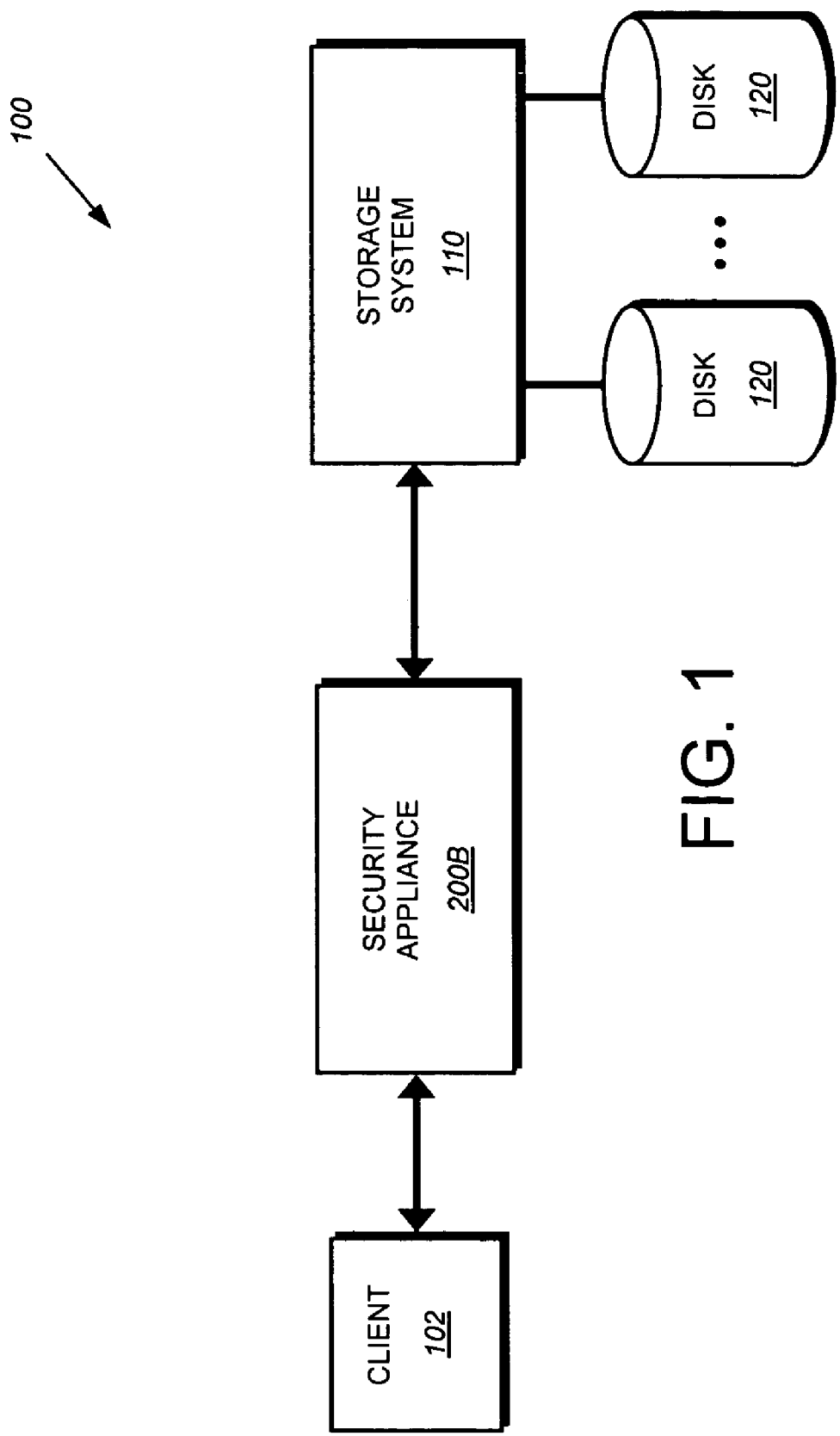
FIG. 1 is a schematic block diagram of an environment including a multi-protocol security appliance cluster that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a highquality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Figure 2:
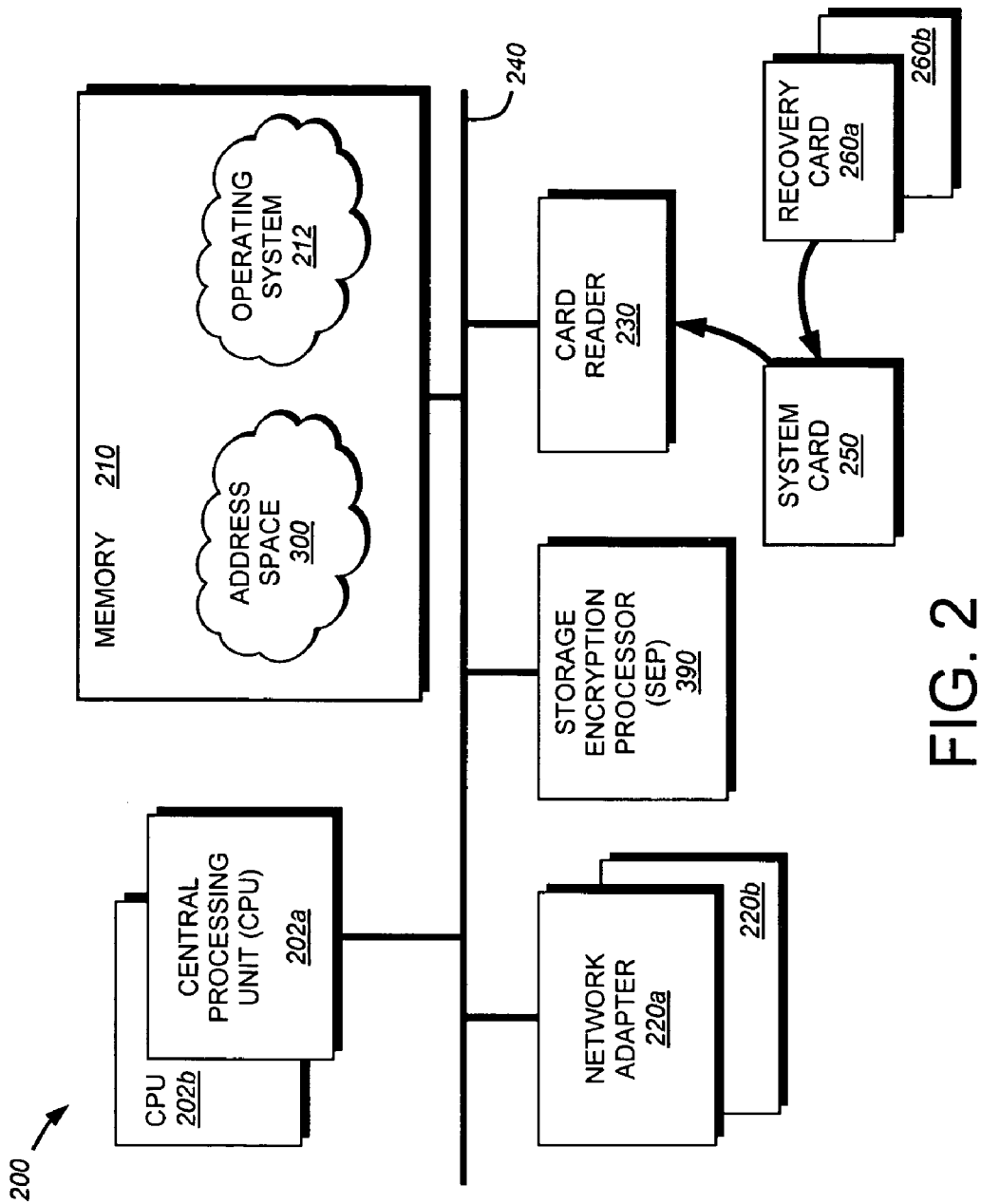
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a storage encryption processor (SEP 390) and a card reader 230 interconnected by a system bus 240, such as a conventional Peripheral Component Interconnect (PCI) bus. The SEP 390 is configured to perform all encryption and decryption to operations for the security appliance in a secure manner; for example, the SEP is configured to protect plaintext encryption keys from system software executing on each CPU 202. Accordingly, the SEP is illustratively embodied as a FIPS 140-2 certified module that is connected to a dedicated interface card or other similar card.

The card reader 230 provides an interface for one or more "smart" recovery cards 260a, b for use in authorizing invocation of certain administrative operations using a split knowledge protocol in accordance with an embodiment of the present invention. Encryption keys may be exchanged between the SEP 390 and system card 250, where they are "secret shared" (cryptographically assigned) to the recovery cards 260 as recovery encryption keys. A quorum setting for the recovery cards 260 may be provided such that the recovery keys stored on the recovery cards are backed up in a threshold scheme whereby, e.g., any 2 of 5 cards are required to perform certain operations. Note that the secret shares are not stored as such on the recovery cards, but rather are encrypted with a key that is assigned to each of the recovery cards. Therefore, the secret shares are "cryptographically assigned" to the recovery cards 260.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
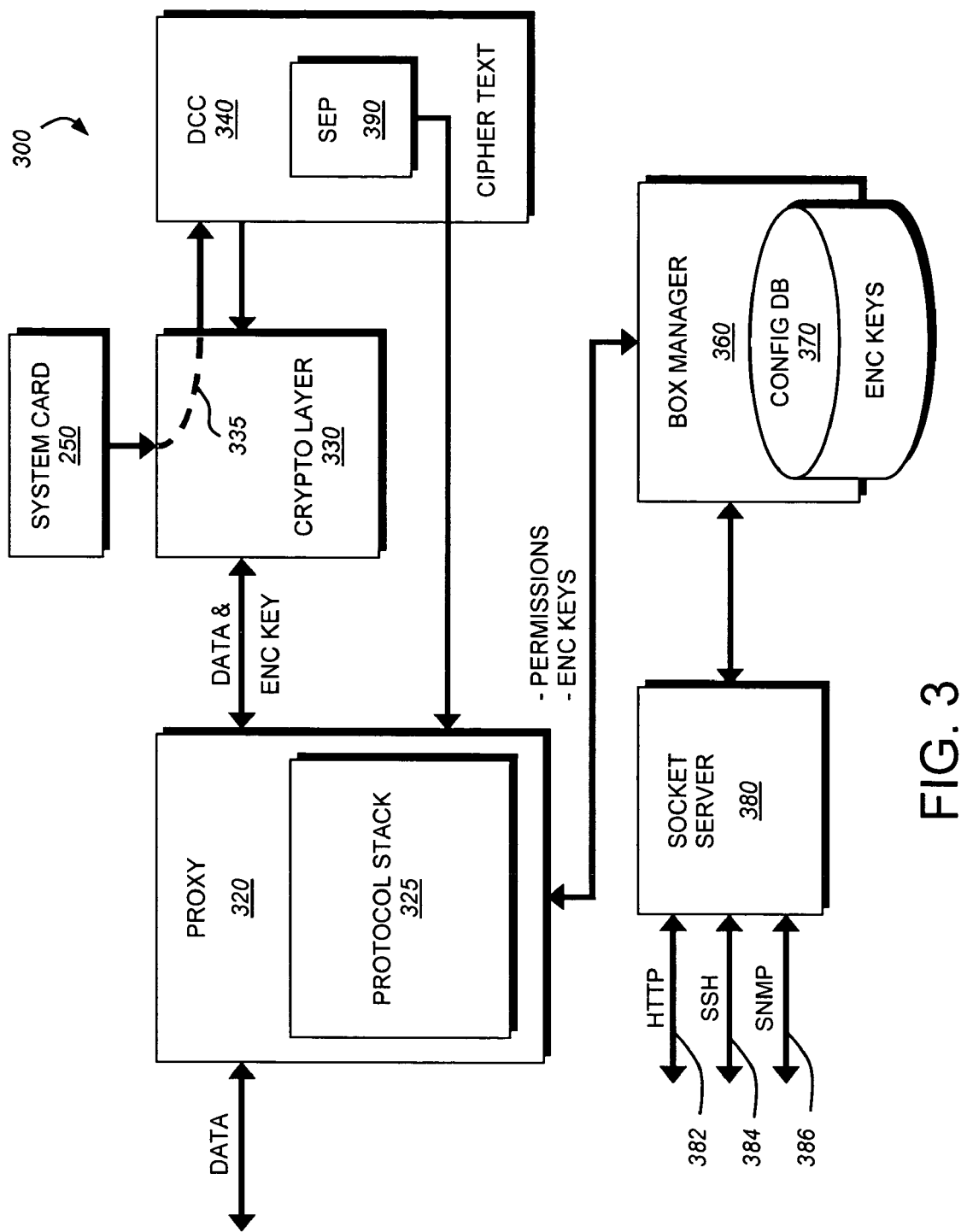
FIG. 3 is a schematic diagram illustrating an arrangement of software processes and modules executing on the security appliance in accordance with an illustrative embodiment of the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., a network protocol stack 325 configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encrypted key. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. Illustratively, SEP 390 resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain customizations to the network protocol stack 325 of the proxy 320 involve virtualization optimizations provided by the appliance. For example, the security appliance 200 manipulates (changes) the source and destination IP addresses of the data access requests and responses.

In the illustrative embodiment, the encrypted key, e.g., a cryptainer key, exchanged between the proxy 320, box manager 360 and crypto layer 330 is encrypted by a domain key. In addition, the previously loaded key used by the DCC 340 (or, more specifically, the SEP 390) to decrypt the encrypted cryptainer key is a domain key previously supplied to the SEP via the system card 250.

Figure 4:
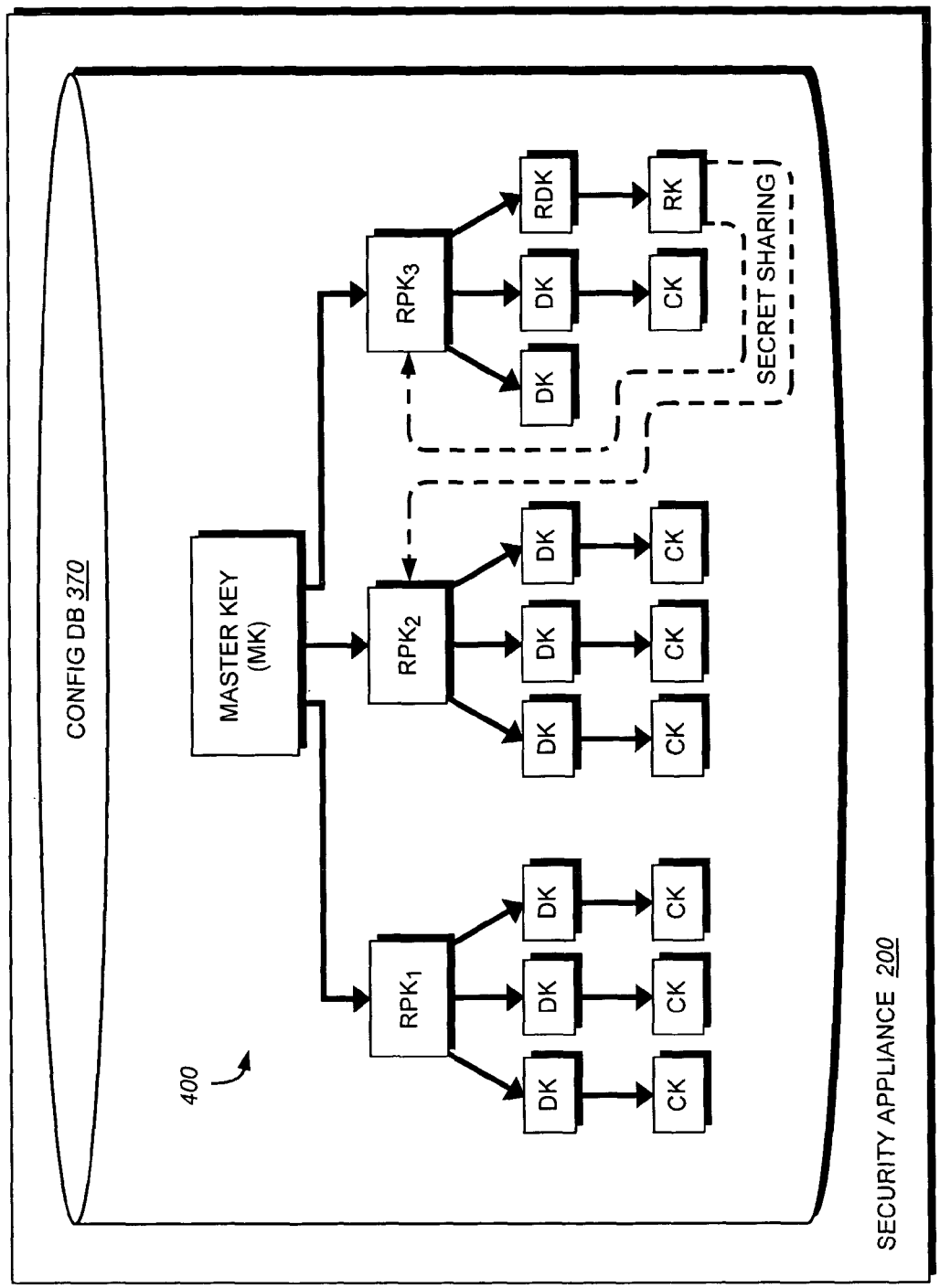
FIG. 4 is a schematic block diagram illustrating a key hierarchy.

FIG. 4 is a schematic block diagram illustrating a key hierarchy 400. The keys used by security appliance 200 are illustratively created during a boot process. At that time, the key hierarchy 400 is also created, generally in response to user interaction with the security appliance via, e.g., an initialization wizard of the GUI. Notably, there are one or more recovery policy keys (e.g., $RPK_1$, $RPK_2$, $RPK_3$) in the key hierarchy 400. Recovery policy keys may impose limits on retrieval of keys wrapped by them, e.g., keys wrapped by the third recovery policy key $RPK_3$ may be recoverable and may be exported to the software modules, e.g., executing on the security appliance 200. Wrapping, in this context, denotes encryption and signing; each key illustratively includes an encryption component, a signature component and various metadata of a package. Thus, to "wrap" a second key with a first key means that the encryption component of the first key is used to encrypt both encryption and signature components of the second key, and the signature component of the first key is used to sign the entire second key (encryption and signature components, as well as the metadata). To "unwrap" a key, a reverse of the above operation is followed.

In the illustrative embodiment, the keys wrapped by each of the recovery policy keys are domain keys DK which, in turn, are used to wrap cryptainer keys CK. These keys are generated by the SEP in response to commands issued by the software modules to generate those keys. Note that each time the SEP generates a key "below" the master key level of the key hierarchy 400, the SEP 390 wraps the generated key with the key directly "above" it in hierarchy and then exports (stores) the wrapped key to the configuration database 370.

One or more recovery cards 260 are utilized to generate one or more recovery keys. Each recovery key illustratively comprises an ID, a symmetric AES key component and an HMAC signing key component. Each recovery card 260 sends its recovery key RK to the SEP 390. One of the domain keys, i.e., the recovery domain key RDK, is designated (dedicated) for use with storing the recovery key; the SEP wraps each recovery key RK with this dedicated recovery domain key RDK. The SEP 390 uses the stored recovery key RK to encrypt "secret shares".

Illustratively, the SEP uses a threshold scheme to convert the second and third recovery policy keys $RPK_2$, and $RPK_3$ into secret shares SS, with each share assigned to one recovery card 260. To ensure that only the correct card can access its share of the recovery policy keys, the share assigned to each card is further wrapped by the recovery key RK assigned to that card. The wrapped shares are exported by the SEP. In order to recover the second and third recovery policy keys $RPK_2$, and $RPK_3$, each wrapped share is loaded into the appropriate recovery card 260, which then unwraps the share. The unwrapped shares of the threshold, or quorum, may thereafter be combined to reconstitute the recovery policies. Essentially, this enables use of the recovery cards to recover the recovery policy keys. With these keys, all keys below those recovery policy keys in the key hierarchy may be unwrapped from a copy.

As noted, a quorum of recovery cards is needed to recover any keys within the key hierarchy. Similarly, a quorum of recovery cards is required to authorize certain sensitive administrative operations.

The present invention provides a split knowledge protocol adapted to authorize administrative operations on a computer. Broadly stated, the computer initiates the split knowledge protocol upon an attempt by an administrator to invoke the operations. At that time, the computer prompts the administrator for information, such as identification of a predetermined number of entities designated to authorize the operation. As a result, the computer creates a bit sequence and splits the bit sequence into a number of segments equal to the predetermined number of entities. Each entity thereafter decrypts a respective element to essentially authorize invocation of the operations. In response, the computer processes the decrypted segments to re-create the bit sequence. As an added level of security, the computer compares the re-created bit sequence with the originally created sequence and, if they match, performs the operations.

In the illustrative embodiment, the entities comprise a plurality of recovery officers associated with the computer, such as a security appliance. Each recovery officer is further associated with a recovery smart card containing a recovery key. To perform certain sensitive administrative operations, an appropriate quorum of the recovery officers associated with the security appliance is designated to authorize the operation. The administrator initiates the operation by identifying the recovery officers designated to authorize the administrative operations. The security appliance then initiates the split knowledge protocol by generating a random bit sequence and splitting the sequence into a number of segments equal to the number of recovery officers authorizing the operation. Illustratively, the sequence is split in a manner that enables generation of the original sequence by exclusive ORing each of the split segments together. The security appliance then encrypts each segment with a recovery key associated with the recovery card of one of the recovery officers authorizing the operation.

The approving recovery officers then decrypt their respective encrypted segments utilizing the associated recovery keys stored within their recovery cards. The decrypted segments are supplied to the security appliance, which processes those segments to re-create the random sequence. Should the re-created random sequence match the initially generated random sequence, the security appliance performs the requested operation as the necessary quorum of recovery officers has authorized the operation.

Figure 5:
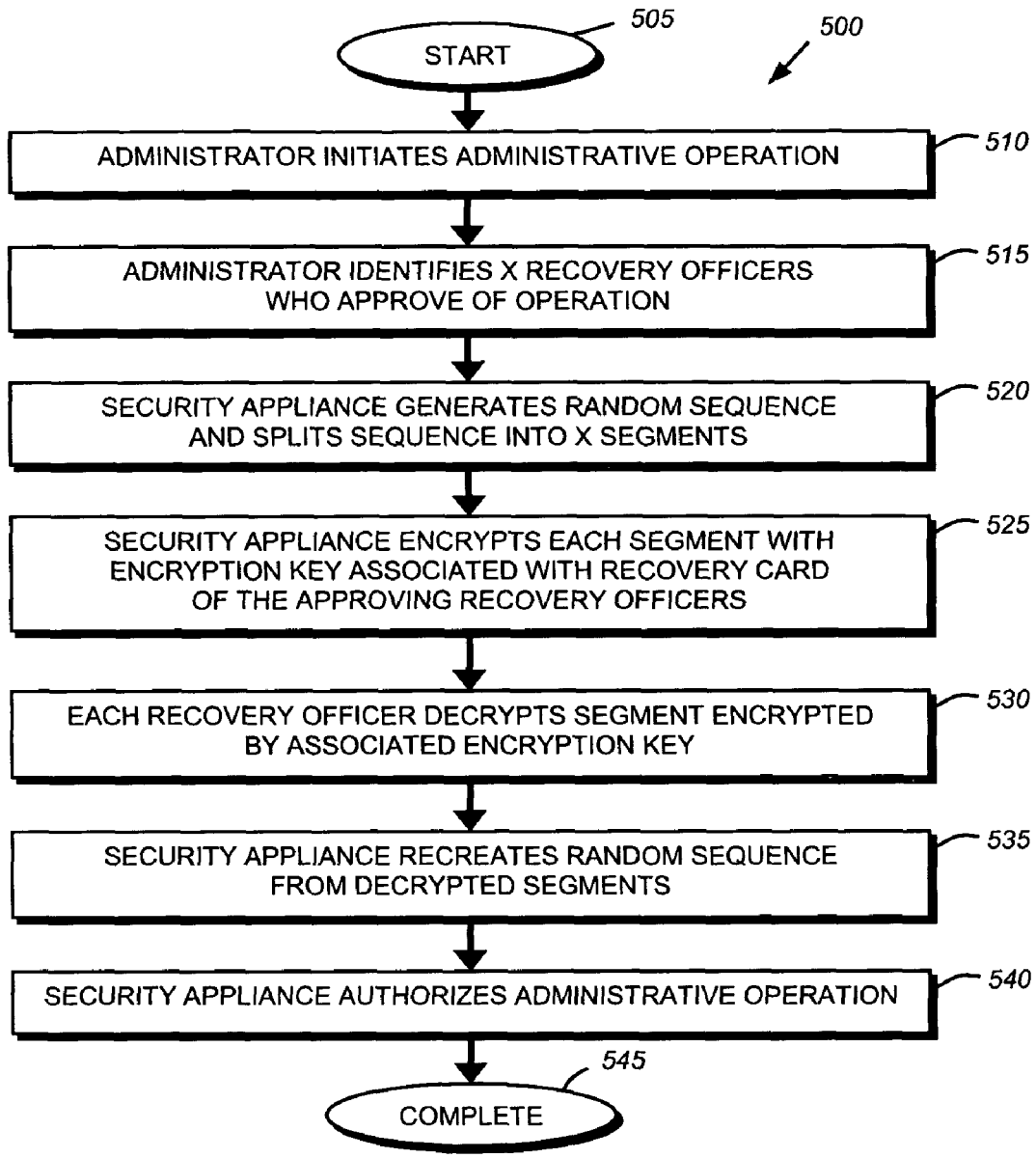
FIG. 5 is a flowchart illustrating a procedure for authorizing an administrative operation in accordance with an illustrative embodiment of the present invention.

FIG. 5 is a flow chart detailing the steps of a procedure 500 for authorizing an administrative action in accordance with an embodiment of the present invention. Illustratively, the operation may comprise a replacement of a recovery card. A recovery card may need to be replaced due to, e.g.; the physical card being damaged, loss of a card, etc. The procedure 500 begins in step 505 and continues to step 510 where the administrator initiates the administrative operation by, e.g., entering the appropriate commands into a CLI and/or GUI. The administrator also identifies the number (x) of recovery officers designated to approve the administrative action in step 515. Illustratively x is equal to or greater and then the necessary quorum of the recovery officers. It should be noted that in alternate embodiments, entities other than recovery officers may be utilized. For example, other officers may be trusted to approve certain administrative operations based on the officers' roles.

In step 520, the security appliance generates a random bit sequence and splits a sequence into x segments. In alternate embodiments of the present invention, the bit sequence may be associated with the administrative operation to be performed. For example, if the operation is to replace a recovery card, an identification of the new recovery card may be associated with the bit stream, e.g., the recovery card identifier may be logically combined with randomly generated bits to generate the bit stream. Illustratively, the bit sequence is split in a manner so that the original bit sequence may be generated by exclusive-ORing the segments together. Each segment is encrypted by the security appliance using the encryption key associated with the recovery card of one of the approving recovery officers (step 525). Illustratively, the encrypted segments are forwarded from the security appliance to a management station (not shown) that includes a smart card reader. This transmission may occur via a secure channel, such as secure hypertext transport protocol (HTTPS). However, it should be noted that in alternate embodiments, other protocols may be utilized. As such, the description of using HTTPS should be taken as exemplary only.

Once each segment has been encrypted, each recovery officer decrypts one of the encrypted segments using the associated encryption key stored within its recovery card in step 530. This decryption may occur by, e.g., each recovery officer inserting its recovery card into the smart card reader and entering an appropriate password to invoke the recovery key stored on the recovery card. The decrypted segments are then illustratively forwarded to the security appliance from the management station via a secure communication channel. The security appliance may then re-create the random bit sequence using the decrypted segments in step 535. The security appliance may then generate the random sequence from the decrypted segments by exclusive ORing them together. It should be noted that any deterministic set of operations may be utilized to generate the original bit sequence from the decrypted segments. As such, the use of exclusive-OR operations should be taken as exemplary only. By re-creating the random sequence and verifying that it matches the original random sequence, the security appliance essentially confirms that a quorum of the recovery officers approve of the operation. In step 540, the security appliance may perform the requested administrative action before the procedure completes in step 545.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Furthermore, while the present invention has been written in terms of recovery officers and recovery keys, other forms of trusted entities may be utilized. For example, in a role based access control environment, entities having certain roles that are associated with appropriate encryption keys may be utilized in place of recovery officers. Thus, for example, the entities needed to authorize a particular operation may vary based on the operation, e.g., recovery officers are needed to authorize the replacement of a recovery card, while other officers may be required to authorize differing operations. As such, the description of recovery officers and recovery cards should be taken as exemplary only. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for authorizing an administrative operation on a computer, comprising:
    identifying a predetermined number of entities designated to authorize the administrative operation;
    generating, by a processor of the computer, a bit sequence;
    splitting the bit sequence into a number of segments equal to the predetermined number of entities designated to authorize the administrative operation;
    encrypting each of the segments with a key specifically associated with each entity;
    decrypting, by each entity, each of the encrypted segments using a detachable storage device associated with that entity to result in individually decrypted segments;
    generating a recreated bit sequence from each of the individually decrypted segments received from each entity; and
    comparing the recreated bit sequence, that was generated from each of the is individually decrypted segments received from each entity, to the bit sequence where only a match between the recreated bit sequence and the bit sequence authorizes the administrative operation to be performed on the computer.

2. The method of claim 1 wherein each entity is a recovery officer associated with the computer.

3. The method of claim 1 wherein splitting further comprises splitting the bit sequence in a manner that enables generation of the bit sequence by exclusive ORing each of the predetermined number of segments together.

4. The method of claim 1 wherein each detachable storage device is a smart card.

5. The method of claim 4 wherein each smart card is associated with a recovery officer.

6. The method of claim 1 wherein the computer comprises a security appliance.

7. The method of claim 1 further comprising performing the administrative operation.

8. The method of claim 1 wherein each recovery key is encrypted by a recovery domain key for storage in a database on the computer.

9. The method of claim 1 wherein the predetermined number of segments equals a quorum associated with the detachable storage devices.

10. The method of claim 1 further comprising transmitting a request to approve the administrative operation from the computer to an entity.

11. The method of claim 1 further comprising identifying a number of recovery officers approving the administrative operation.

12. The method of claim 11 wherein the predetermined number of segments equal the number of recovery officers approving the administrative operation.

13. A system configured to authorize an administrative operation, the system comprising:
    a computer comprising one or more processors configured to, in response to receiving a request to perform the administrative operation, identify a predetermined number of entities designated to authorize the administrative operation, generate a bit sequence, split the bit sequence into a number of segments equal to the predetermined number of entities, encrypt each of the segments with a key specifically associated with each entity, send each encrypted segment to its associated entity, receive decrypted segments from each entity wherein each entity uses a detachable storage device associated with that entity to perform the decryption to result in individually decrypted segments, generate a recreated bit sequence from the individually decrypted segments, and compare the recreated bit sequence, generated from the individually decrypted segments, to the bit sequence where only a match between the recreated bit sequence and the bit sequence authorizes the administrative operation to be performed.

14. The system of claim 13 wherein the computer comprises a security appliance.

15. The system of claim 14 wherein the request comprises an identification of a number of recovery officers approving of the administrative operation.

16. The system of claim 15 wherein the predetermined number of segments equal the number of recovery officers approving of the administrative operation.

17. The system of claim 16 wherein the administrative operation comprises replacing one of the detachable storage devices.

18. The system of claim 13 wherein the bit sequence may be generated by exclusive ORing each of the segments together.

19. A non-transitory computer readable medium containing executable program instructions executed by a processor, comprising:
    program instructions that identify a predetermined number of entities designated to authorize an operation;
    program instructions that generate a bit sequence;

program instructions that split the bit sequence into a number of segments equal to the predetermined number of entities;

program instructions that encrypt each of the segments with a key specifically associated with each entity;

program instructions that decrypt, at each entity, each of the encrypted segments using a detachable storage device associated with that entity to result in individually decrypted segments;

program instructions that generate a recreated bit sequence from each of the individually decrypted segments received from each entity; and is program instructions that compare the recreated bit sequence, generated from each of the individually decrypted segments, to the bit sequence where only a match between the recreated bit sequence and the bit sequence authorizes the operation to be performed on a computer having one or more processors.

20. The computer readable medium of claim 19 wherein the program instructions that split further comprises program instructions that split the bit sequence in a manner that enables generation of the bit sequence by exclusive ORing each of the predetermined number of segments together.

21. A method for authorizing an administrative operation on a computer, the method comprising:

identifying a predetermined number of entities designated to authorize the operation, the predetermined number of entities being designated based on the administrative operation;

generating, by a processor of the computer, a bit sequence;

splitting the bit sequence into a number of segments equal to the predetermined number of entities;

encrypting each of the segments with a key specifically associated with at least one of the entities;

decrypting, by each entity, each of the encrypted segments using a detachable storage device associated with that entity to result in individually decrypted segments; and re-generating the bit sequence from the individually decrypted segments received from each entity, wherein a match between the re-generated bit sequence, from the individually decrypted segments received from each entity, and the bit sequences authorizes the administrative operation.

22. The method of claim 21 wherein the bit sequence is associated with the administrative operation.

23. The method of claim 22 wherein the administrative operation comprises replacing a first detachable storage device and wherein the bit sequence is associated with an identifier of a second detachable storage device replacing the first detachable storage device.

24. The method of claim 21 wherein the bit sequence may be re-generated by performing one or more logical operations on the segments.

25. The method of claim 4 wherein the smart card is a recovery card.

* * * * *

UNITED STATES PATENT AND TRADEMARK OFFICE
CERTIFICATE OF CORRECTION

| | | |
|---|---|---|
| PATENT NO. | : 8,190,905 B1 | Page 1 of 1 |
| APPLICATION NO. | : 11/541024 | |
| DATED | : May 29, 2012 | |
| INVENTOR(S) | : Lawrence Wen-Hao Chang | |

It is certified that error appears in the above-identified patent and that said Letters Patent is hereby corrected as shown below:

The Abstract on page 1 should read: "A system and method for authorizing administrative operations in a computer is provided. The computer initiates the split knowledge protocol upon an attempt by an administrator to invoke the operations. The administrator identifies a predetermined number of entities designated to authorize the operation. The computer creates a bit sequence and splits the bit sequence into a number of segments equal to the predetermined number of entities. Each entity thereafter decrypts a respective element to essentially authorize invocation of the operations. In response, the computer processes the decrypted segments to re-create the bit sequence. As an added level of security, the computer ~~coma) pares~~compares the re-created bit sequence with the originally created sequence and, if they match, performs the operations."

Col. 1, line 24 should read: "blocks, configured to store information,~~is~~ such as the actual"

Col. 3, line 40 should read: "keys stored within their recovery cards. The decrypted ~~to~~"

Col. 4, line 60 should read: "tion and decryption ~~to~~ operations for the security appliance in"

Col. 6, line 3 should read: "384 for ~~cornmand~~command line interface (CLI) command administra-"

Col. 9, line 59 should read: "from each of the ~~is~~ individually decrypted segments"

Col. 11, line 13 should read: "~~is~~ program instructions that compare the recreated bit"

Signed and Sealed this
Seventh Day of August, 2012

David J. Kappos
*Director of the United States Patent and Trademark Office*